United States Patent
Knobloch et al.

(10) Patent No.: US 10,870,073 B2
(45) Date of Patent: Dec. 22, 2020

(54) VACUUM AND/OR PRESSURE FILTRATION DEVICE FOR FILTRATION OF A SUSPENSION

(71) Applicant: ANDRITZ KMPT GmbH, Vierkirchen (DE)

(72) Inventors: Wolfgang Knobloch, Tutzing (DE); Dieter Scherer, Pfaffenhofen (DE)

(73) Assignee: ANDRITZ KMPT GmbH, Vierkirchen (DE)

( * ) Notice: Subject to any disclaimer, the term of this patent is extended or adjusted under 35 U.S.C. 154(b) by 0 days.

(21) Appl. No.: 16/125,981

(22) Filed: Sep. 10, 2018

(65) Prior Publication Data
US 2019/0366244 A1 Dec. 5, 2019

(30) Foreign Application Priority Data
Jun. 5, 2018 (EP) .................................... 18175993

(51) Int. Cl.
| B01D 33/073 | (2006.01) |
| B01D 33/067 | (2006.01) |
| B01D 33/09 | (2006.01) |
| B01D 33/74 | (2006.01) |

(Continued)

(52) U.S. Cl.
CPC ......... *B01D 33/073* (2013.01); *B01D 33/067* (2013.01); *B01D 33/801* (2013.01)

(58) Field of Classification Search
CPC .... B01D 33/067; B01D 33/073; B01D 33/09; B01D 33/801
See application file for complete search history.

(56) References Cited

U.S. PATENT DOCUMENTS

| 919,628 A | 4/1909 | Oliver |
| 1,223,245 A | 4/1917 | Biesel |
| 1,453,311 A | 5/1923 | Engel, Sr. |

(Continued)

FOREIGN PATENT DOCUMENTS

| CA | 2161851 A1 | 5/1997 |
| CN | 206 103 473 U | 4/2017 |

(Continued)

OTHER PUBLICATIONS

European Patent Office, English abstract of DE 100 05 796 A1, printed on Dec. 20, 2011.

(Continued)

*Primary Examiner* — Benjamin M Kurtz
(74) *Attorney, Agent, or Firm* — Cahn & Samuels, LLP

(57) ABSTRACT

A vacuum and/or pressure filtration device includes a filter drum defining a drum axis and it is supported rotatably around the drum axis. The filter drum includes an outer jacket, by which a plurality of filter cells are formed, which extend along the drum axis, which are arranged adjacent to each other all around the drum axis, and which are equipped on their outer side with a filter medium; and an inner jacket, which is arranged adjacent to the outer jacket, which has an inner jacket outer surface, which limits the filter cells radially inside such that by the inner jacket outer surface a plurality of draining surfaces are formed, on which the liquid passing through the respective filter medium during filtration of the suspension can drain as a filtrate. The filtration device filters a suspension having solid and liquid components.

19 Claims, 8 Drawing Sheets

Figure 1:
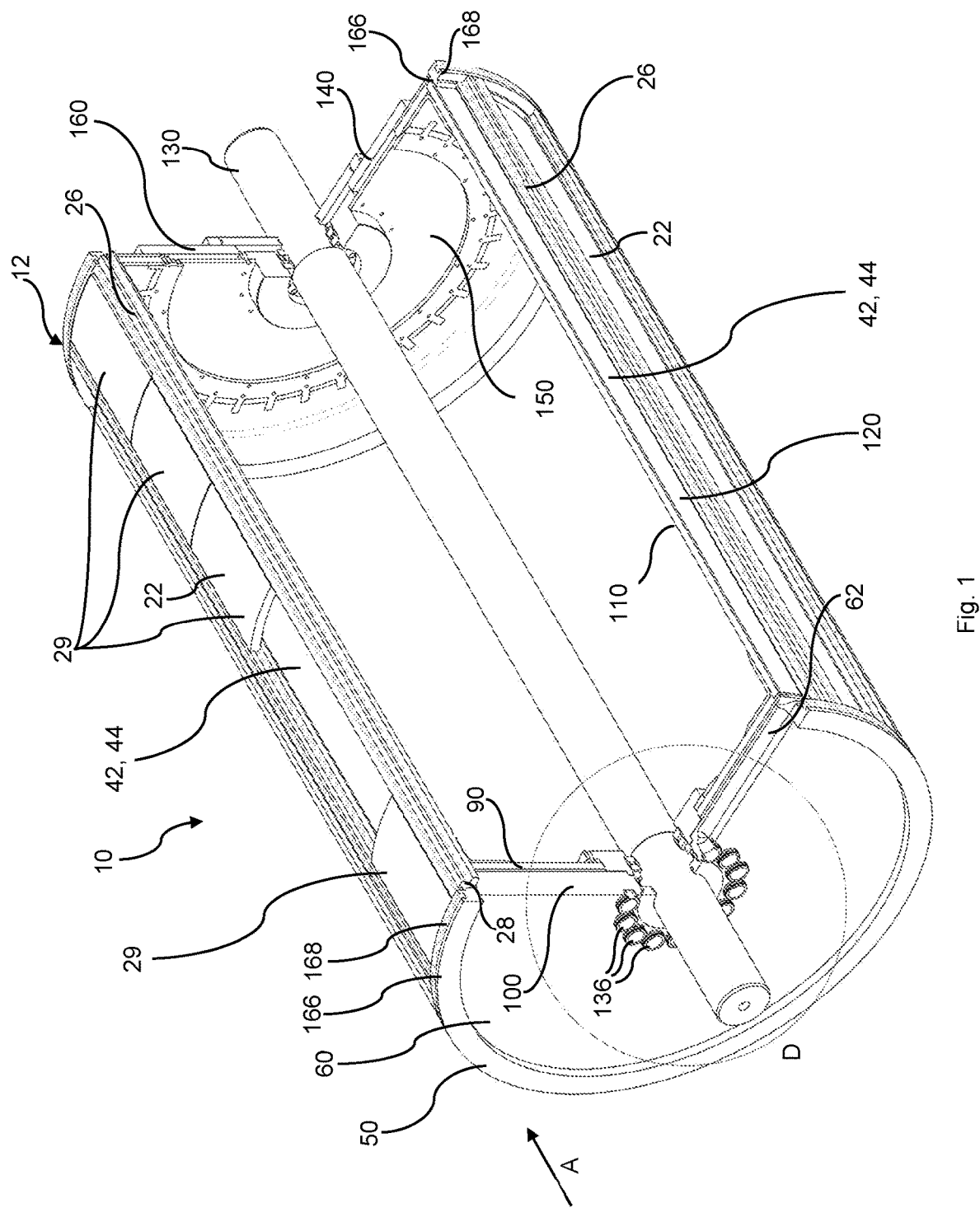

(51) Int. Cl.
*B01D 33/06* (2006.01)
*B01D 33/80* (2006.01)

(56) References Cited

U.S. PATENT DOCUMENTS

| | | | |
|---|---|---|---|
| 1,667,465 A | | 4/1928 | Wait |
| 2,092,111 A | | 9/1937 | Dons et al. |
| 2,148,903 A | | 2/1939 | Gamsey |
| 2,362,300 A | | 11/1944 | Nyman |
| 2,823,806 A | | 2/1958 | Harlan |
| 3,061,477 A | | 10/1962 | Lavellee |
| 3,096,280 A | | 7/1963 | Davis et al. |
| 3,235,086 A | | 2/1966 | Krynski |
| 3,306,460 A | | 2/1967 | Luthi |
| 3,363,774 A | | 1/1968 | Luthi |
| 3,494,473 A | * | 2/1970 | Krynski ............... B01D 33/067 210/404 |
| 3,630,380 A | | 12/1971 | Bamebl |
| 3,638,798 A | | 2/1972 | Basfeld et al. |
| 3,794,178 A | * | 2/1974 | Luthi ................... B01D 33/067 210/404 |
| 3,894,899 A | * | 7/1975 | Konopatov ............ B01D 33/09 156/187 |
| 4,442,001 A | | 4/1984 | Davis |
| 4,695,381 A | | 9/1987 | Ragnegard |
| 5,046,338 A | | 9/1991 | Luthi |
| 5,055,205 A | | 10/1991 | White |
| 5,160,434 A | * | 11/1992 | Heino ................... B01D 33/09 210/391 |
| 5,281,343 A | * | 1/1994 | Lewis ................... B01D 33/09 210/784 |
| 5,683,582 A | | 11/1997 | Luthi |
| 6,488,849 B2 | | 12/2002 | Bertolotti et al. |
| 9,004,289 B2 | | 4/2015 | Hegnauer et al. |
| 9,216,369 B2 | | 12/2015 | Grim et al. |
| 2005/0077254 A1 | | 4/2005 | Sawhill et al. |
| 2005/0161391 A1 | | 7/2005 | Ettlinger |
| 2012/0160761 A1 | | 6/2012 | Hegnauer |

FOREIGN PATENT DOCUMENTS

| | | |
|---|---|---|
| DE | 1 177 614 B | 9/1964 |
| DE | 10005796 A1 | 8/2001 |
| EP | 0033371 A1 | 8/1981 |
| EP | 2468379 A1 | 6/2012 |
| GB | 2361879 A | 11/2001 |
| WO | 9915255 | 4/1999 |

OTHER PUBLICATIONS

KraussMafei, Labordruckfilter, by 2011.
European Patent Office, English abstract of EP003337, printed on Nov. 29, 2012.
European Patent Office, English abstract for CN206103473U, printed Feb. 14, 2019.
European Patent Office, extended European Search Report for Application No. EP 18 17 5993, dated Nov. 20, 2018.
European Patent Office, English abstract for EP2468379A1, printed Dec. 13, 2019.

* cited by examiner

VACUUM AND/OR PRESSURE FILTRATION DEVICE FOR FILTRATION OF A SUSPENSION

This application claims priority to European Patent Office patent application number 18 175 993.7 filed on Jun. 5, 2018, which is hereby incorporated by reference.

I. FIELD OF THE INVENTION

The invention relates to a vacuum and/or pressure filtration device for filtration of a suspension which comprises a solid and a liquid.

II. BACKGROUND OF THE INVENTION

For vacuum and/or pressure filtration devices, for example, multi filter cell filter drums are used, wherein the filter cells, which are arranged around the circumference of the filter drum, are usually connected to an inner or outer tubing, at which a respectively assigned filtrate discharge pipe is connected to a respective filter cell, by which (discharge pipe) the filtrate is discharged. Such vacuum and/or pressure filtration devices are known, for example, from U.S. Pat. Nos. 3,630,380 and 3,363,774.

III. SUMMARY OF THE INVENTION

By at least one embodiment of the invention, a vacuum and/or pressure filtration device for filtration of a suspension, which comprises a solid and a liquid, is created, for which a multi filter cell filter drum is used, wherein an improved filtrate discharging can be achieved with simple design.

For this, the invention in at least one embodiment provides a vacuum and/or pressure filtration device for filtration of a suspension, which comprises a solid and a liquid, including a filter drum, wherein the filter drum defines a drum axis (e.g. a longitudinal drum axis) and is rotatably supported around the drum axis. The filter drum includes an outer jacket, (which, e.g., is formed cylindrically and) by which a plurality of filter cells are formed, which filter cells extend along the drum axis, which filter cells are arranged adjacent to each other around the drum axis and which filter cells are equipped on their outer side with a filter medium; an inner jacket, which inner jacket is arranged adjacent to the outer jacket, which inner jacket has an inner jacket outer surface, which inner jacket outer surface limits the filter cells radially inside such that a plurality of draining surfaces are formed by the inner jacket outer surface, on which draining surfaces the liquid passing through the respective filter medium during filtration can drain (off) as a filtrate, and which inner jacket is formed so as to be conically tapered at least toward a first drum end face of the filter drum such that the respective draining surface correspondingly extends radially and inwardly in an inclined manner at least toward the first drum end face of the filter drum; and a first drum end face-sided plate (e.g. in form of a ring plate), in which a plurality of discharge channels, which are respectively assigned to the filter cells, for discharging the filtrate are formed (e.g. integrally formed, e.g. integrally formed in an encapsulated manner), wherein the respective draining surface is fluidly connected to a respectively assigned one of the discharge channels, wherein the first drum end face-sided plate is equipped with a plurality of recesses (e.g. of circumferential end face recesses, i.e. of recesses incorporated in the circumferential end face (e.g. the end face located on the circumference) of the first drum end face-sided plate) along its outer circumference, which (recesses) are respectively assigned to the discharge channels and which (recesses) form an inlet of the respectively assigned discharge channel, into which (inlet) the respectively assigned draining surface leads (e.g. leads directly) and which (inlet) is formed in a manner so as to tapered toward the discharge channel such that the respective discharge channel is connected to the assigned recess at a (the) radially innermost site thereof (of said assigned recess).

By the conical shape of the inner jacket in combination with the discharge channels formed in the first drum end face-sided plate and the recesses incorporated (e.g. engraved) in (into) the first drum end face-sided plate on the circumferential end face thereof and along the outer circumference thereof, an improved filtrate discharging with, e.g., a corresponding reduced pressure loss, can be achieved, wherein the inner jacket outer surface may be formed in a smooth manner along the drum axis (whereby the flow resistance is reduced), and wherein larger flow deflections and a narrow channel flow occur only along a relatively short portion on/in the first drum end face-sided plate. Further, the device according to at least one embodiment of the invention may be implemented without piping in a simple way.

Between the filter cells there are arranged, for example, elongated separator bars, e.g. fixation bars, which are, e.g., formed as clamping bars, which separate the filter cells from each other in a circumferential direction of the filter drum and which extend along the drum axis and by which, e.g., the respective filter medium, which is assigned to a respective filter cell, is fixed, e.g., is fixed via clamping, to the filter drum. The filter cells and, thereby, their respectively assigned draining surface extend, e.g., nearly entirely along the whole length of the filter drum, along the longitudinal drum axis of the filter drum. The same correspondingly applies to the separator bars and the filter media.

Seen in the direction of the drum axis, e.g., the radially innermost site (e.g. location) of each recess may be arranged offset with respect to a circumferential center of an outer circumferential portion of the respective filter cell (e.g. of the respective recess) into a direction of rotation (e.g., into a direction of rotation intended during filtration operation) of the filter drum. This may have an advantage in that in the area shortly before the plunging of the drum portion leading in the direction of rotation (of the drum) (around the drum axis), in which area, e.g., a blowing off of a filter cake, present on the filter medium, takes place by supplying pressurized air through the discharge channel in a direction from a (radial) inside toward the drum outer jacket and toward the filter cake resting on the filter medium thereof, there may be achieved, with a higher certainty, a lower residual humidity in the recess, which residual humidity otherwise would again be supplied to the filter cake by the pressurized air.

As apparent from the following further developments, the device according to at least one embodiment of the invention may also be of advantage in that it is producible in a composite design, which may be of advantage in regards of its corrosion-resistance and, thereby, its durability.

The first drum end face-sided plate may, e.g., include a first load-bearing inner (e.g. as seen axially, inner) support plate, which, e.g., is formed in form of a support ring plate, and an outer (e.g. as seen axially, outer) functional plate (wherein "inner" and "outer" are respectively referred to the filter drum) which is supported by the first support plate and in which the discharge channels and the recesses are formed in an isolated manner from the first support plate. This, for example, allows to receive a torque, from a drive shaft and transferred to the filter drum, via the first support plate, whereby the functional plate may be designed merely in regards of its function for discharging filtrate, supplying pressurized air, applying vacuum (for, e.g., suction of filtrate), wherein no load-bearing properties have to be taken in consideration for the functional plate.

Correspondingly, for example, the inner jacket may include a load-bearing inner support jacket and an outer functional jacket which is supported by the support jacket and by which the inner jacket outer surface is formed in a manner isolated (e.g. separated) from the support jacket.

The support jacket and the first support plate may, for example, be rigidly connected to each other (e.g. to thereby form a load-bearing connection), wherein the support jacket, the first support plate, the outer functional plate and the functional jacket are arranged and configured such that the support jacket and the first support plate are isolated (e.g. separated) from both the recesses and the inner jacket outer surface. In this application, isolated, e.g., means fluidly isolated, which in this case means that the first support plate and the support jacket, thereby, are isolated/encapsulated from a touch and/or a contact with the filtrate. This allows to make the support jacket and the first support plate of a material, e.g. a metal material, which does not have to be corrosion-resistant against the filtrate and which, for example, is selected particularly with respect to the necessary stability. The support jacket is isolated by the functional jacket, arranged thereon, against a contact with the filtrate draining (off) on the outer surface thereof (=inner jacket outer surface), and the discharge channels and the recesses may, e.g., be formed in the functional plate in a manner to be encapsulated from the support plate, wherein the functional jacket, e.g., overlaps the recesses and tightly closes/seals against the functional plate such that, also in the area of the intersection between the respective draining surface and the recess, there is no access for the filtrate to the first support plate and the support jacket.

Further, e.g., outlet ports (e.g. outlet ports axially leading out of the first drum end face-sided plate) of the discharge channels are formed in a radially inner portion of the functional plate (e.g. in an integral manner, e.g. in an integrally encapsulated manner). Such outlet ports, e.g., are connected to a control head attachable to the filter drum and then co-rotatable with the filter drum, which (control head), in turn, cooperates with a stationary control component, to which air pressure supply devices and vacuum supply devices may be connected to respectively apply pressurized air (for filter cake blow off) or vacuum (for filtrate suction) to the discharge channels in accordance with the rotational position of the filter drum.

The vacuum and/or pressure filtration device may include a drive shaft, which extends centrally to the filter drum, wherein the drive shaft is fixedly connected, optionally fixedly connected in a releasable manner, to the first support plate such that a torque applied to the drive shaft is transmitted from the drive shaft to the filter drum via the first support plate. The drive shaft may be formed in one piece and may be a drive shaft extending centrally through the filter drum. The drive shaft may, e.g., also be a drive shaft formed by first and second drive shaft elements, which drive shaft elements are provided in a manner to be separated from each other in an axial direction of the filter drum, wherein the first drive shaft element is fixed to the first drum end face-sided plate, e.g. to the first support plate thereof, in a load-bearing manner, and the second drive shaft element is fixed to a second drum end face-sided plate of the filter drum in a load-bearing manner, which is located, seen along the axial direction of the filter drum, opposite to the first drum end face-sided plate. If, in the latter case, a drive torque is applied to only one of the first and second drive shaft elements of the drive shaft, then the drive torque is transmitted to the filter drum only by this one of the first and second drive shaft elements, wherein the other one of the first and second drive shaft elements merely has the function (s) to transmit and/or receive other rotational bearing reactions/forces.

As previously explained, the filter drum may include a/the second drum end face-sided plate, which, e.g., is formed in form of a ring plate, which is arranged opposite to the first drum end face-sided plate along the drum axis, wherein the inner jacket and the outer jacket extend along the drum axis between the two drum end face-sided plates and (axially) connect the latter to each other, and wherein the second drum end face-sided plate comprises a second load-bearing inner support plate, which, e.g., is formed in form of a support ring plate), which is rigidly connected to the support jacket, and a(n) (outer) cover plate (e.g. cover ring plate) arranged on the second support plate, wherein the cover plate, the functional jacket and the functional plate are connected to each other such that they form an encapsulation with respect to the two support plates and the support jacket, by which (encapsulation) the two support plates and the support jacket are isolated against a touch contact with the suspension which, during filtration operation, is present outside on the filter drum.

With this design, the load-bearing inner support construction of a support jacket and support plates is fully encapsulated against a touch contact with the suspension present and/or corrosively acting on the outside of the filter drum during filtration operation. Correspondingly, the functional jacket, e.g., is connected to the cover plate such that the second drum end face-sided support plate is isolated and/or encapsulated against a touch contact with the filtrate.

The second drum end face-sided plate may, e.g., also be formed in a manner as it is described in this application for the first drum end face-sided plate, wherein, accordingly, the cover plate may, e.g., be formed as a functional plate (e.g. a functional ring plate), which may be structured in a manner as it is described in this application for the functional plate of the first drum end face-sided plate. In this case, e.g., the inner jacket is then formed so as to be conically tapered along the drum axis toward both the first and the second drum end faces of the filter drum (e.g. from respectively at least approximately the axial center of the filter drum) such that the respective draining surface correspondingly extends radially and inwardly toward the first and second drum end faces of the filter drum in an inclined manner, wherein then a plurality of discharge channels, respectively assigned to the filter cells, for discharging the filtrate are formed (e.g. integrally formed, e.g. integrally encapsulated) in the second drum end face-sided plate, wherein the respective draining surface is fluidly connected to a respectively assigned one of the discharge channels in the second drum end face-sided plate, and wherein then, e.g., also the second drum end face-sided plate may be equipped with a plurality of recesses (e.g. of circumferential end face recesses, i.e. of recesses which are incorporated into the circumferential end face of the second drum end face-sided plate) along its outer circumference, which are respectively assigned to the discharge channels and which form an inlet of the respectively assigned discharge channel, into which (inlet) the respectively assigned draining surface leads (e.g. leads directly), and which is formed in manner so as to be tapered toward the discharge channel such that the respective discharge channel is connected at the radially innermost site of the assigned recess of the second drum end face-sided plate to this recess.

As explained above, the drive shaft may, for example, be fixedly connected, optionally fixedly connected in a releasable manner, to the second drum end face-sided plate such that a torque applied to the drive shaft is transmitted and/or is transmittable from the drive shaft to the filter drum via the two support plates.

The functional plate and the functional jacket and, e.g., the cover plate are, e.g., of a different material than the first and/or the second support plate and the support jacket. Here, a material suitable with respect to corrosion-resistance may be used for the functional plate and the functional jacket and the cover plate, which (material) does not need to have high stability values. In contrast to this, for the support plate and/or the support plates and the support jacket, a material with suitable stability for receiving the forces acting on the filter drum may be used, wherein the corrosion-resistance of this material may be lower than the one of that material or those materials, of which the functional plate and the functional jacket and, e.g., the cover plate are made.

The functional plate and the functional jacket and, e.g., the cover plate are, e.g., of a same material. The first and/or the second support plates and the support jacket are, e.g., also of a same material.

The functional plate and the functional jacket and, e.g., the cover plate are, e.g., of a plastic material. The first support plate (or, e.g., both support plates) and the support jacket are, e.g., of a weldable metal material and (are) welded to each other to thereby form a load-bearing welded connection.

IV. BRIEF DESCRIPTION OF THE DRAWINGS

Figure 2:
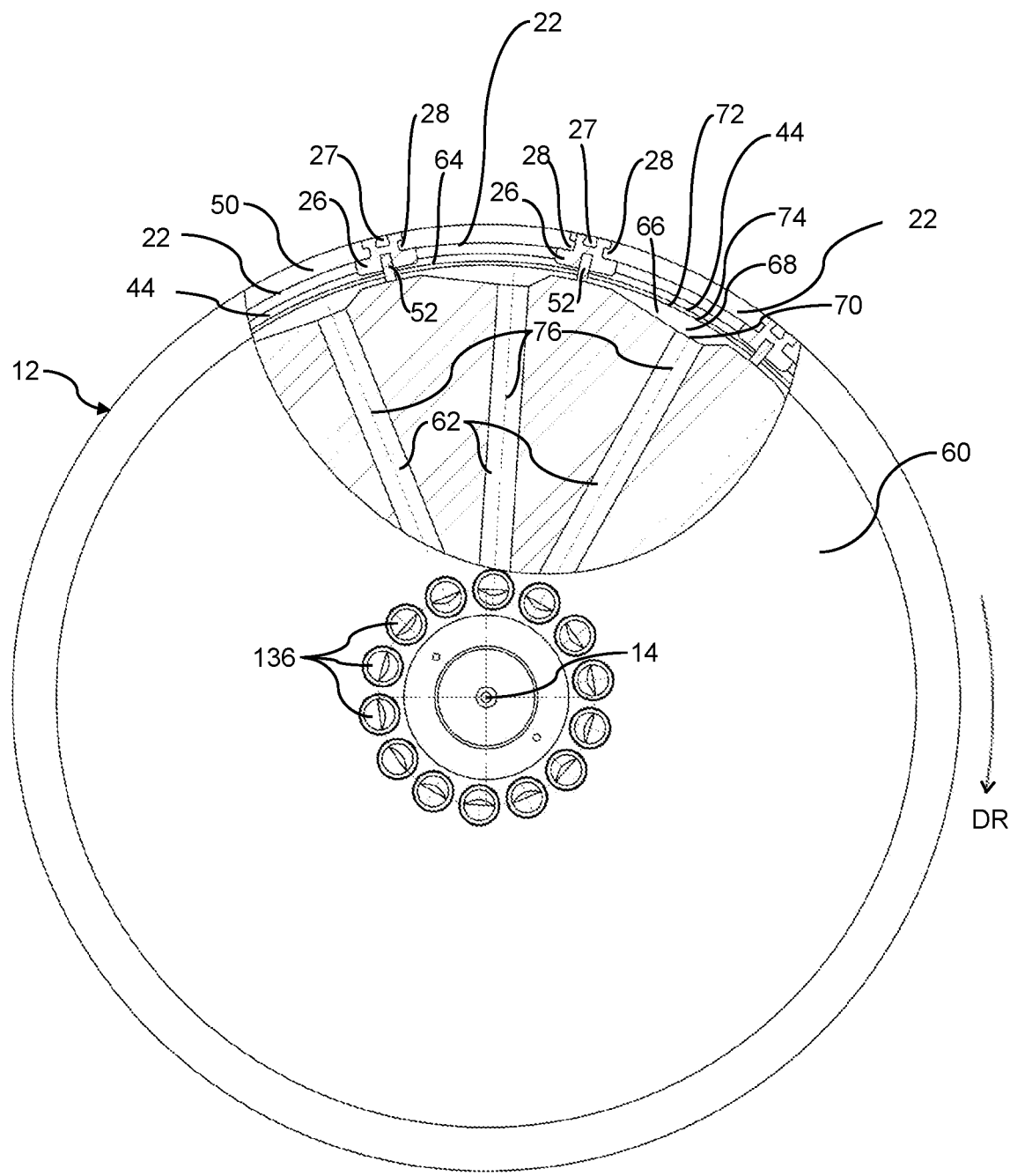
Figure 3:
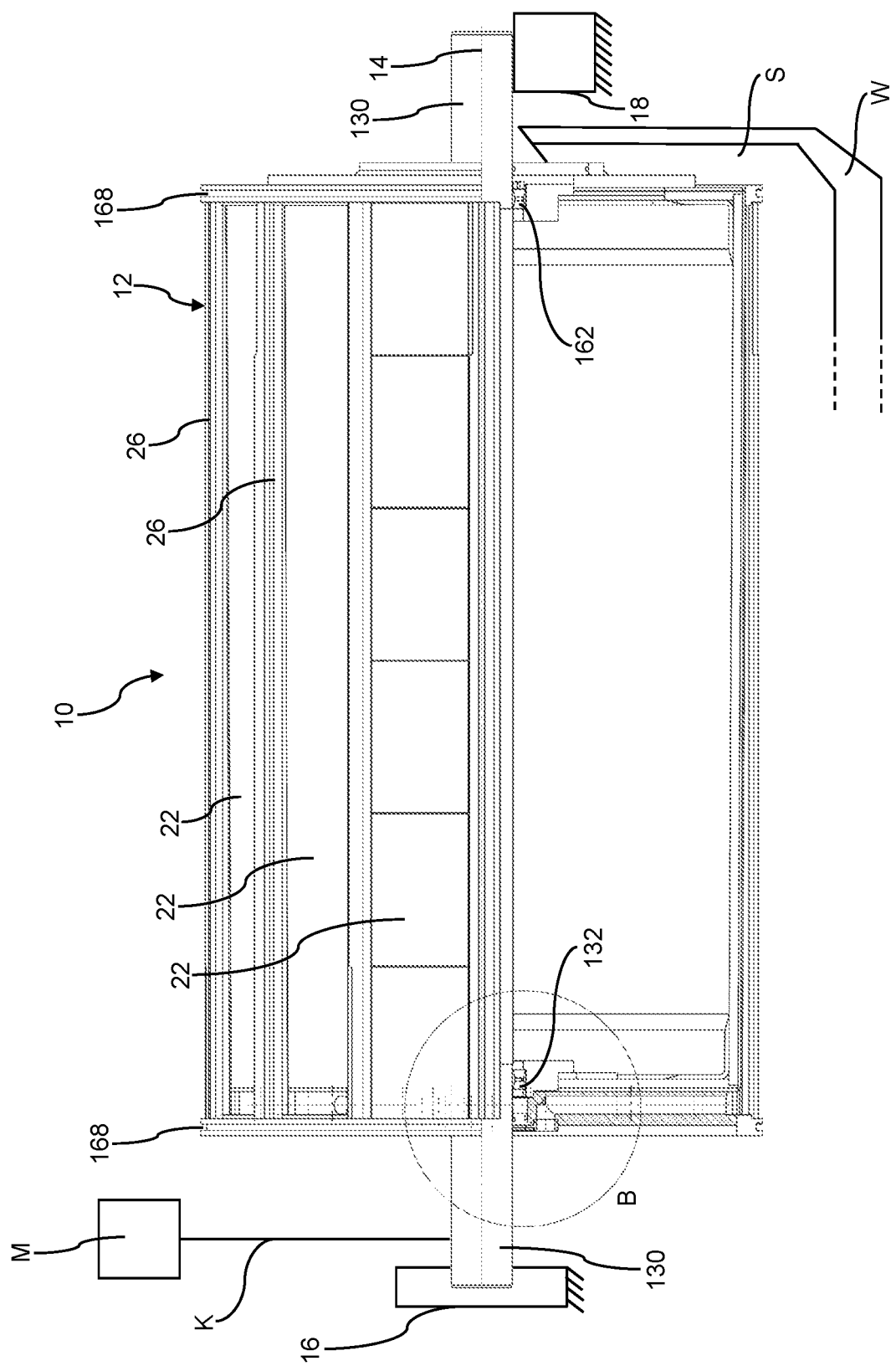
Figure 4:
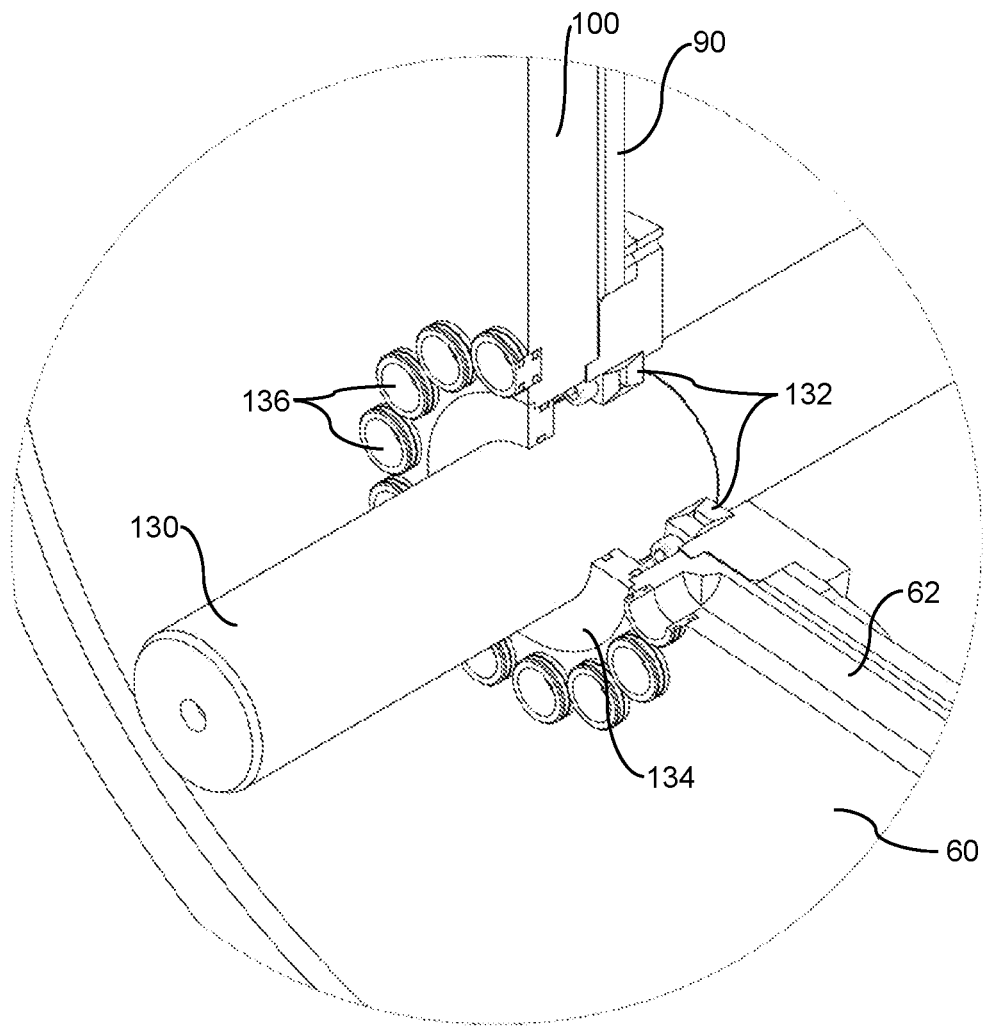
Figure 5:
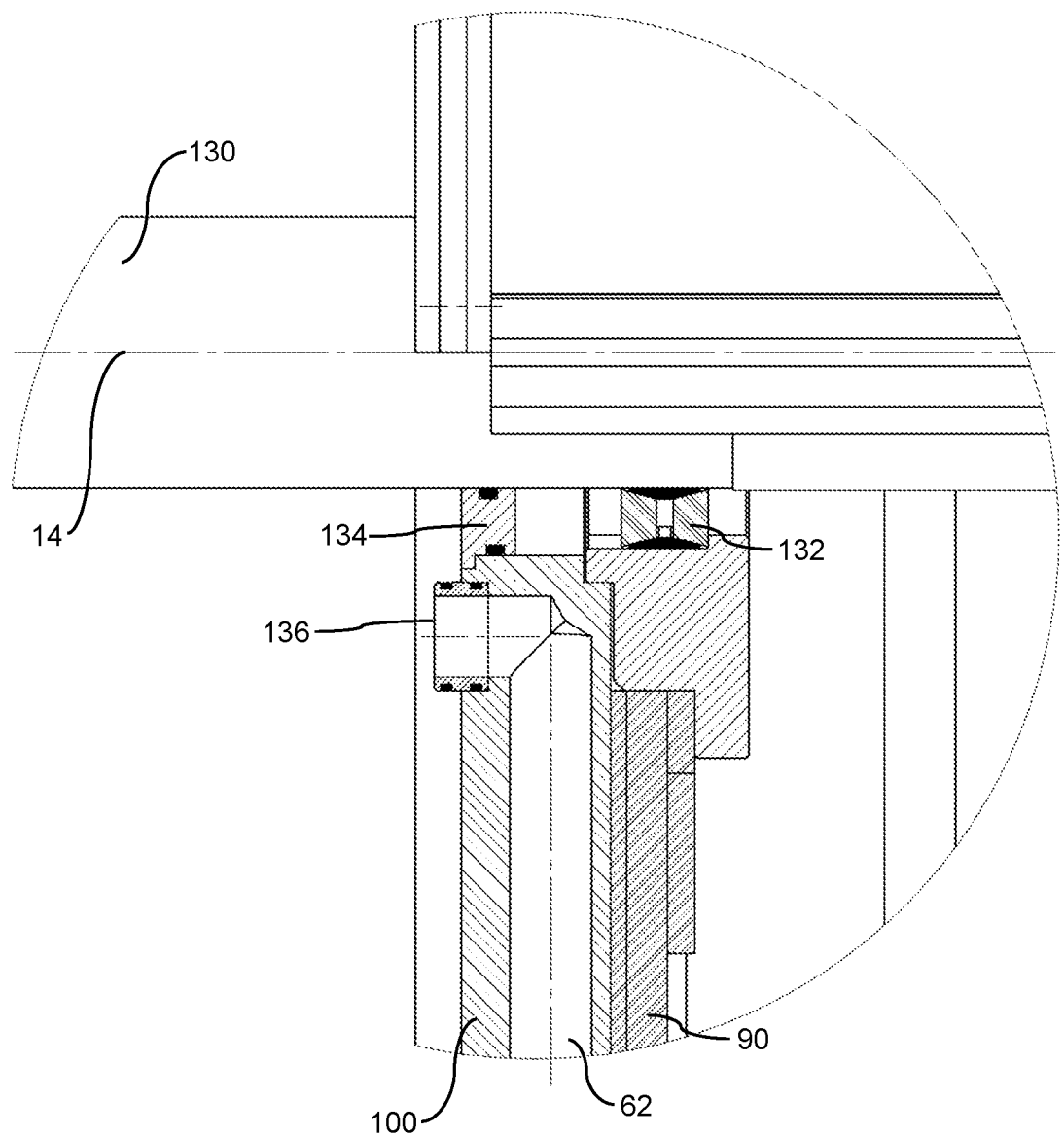
Figure 6:
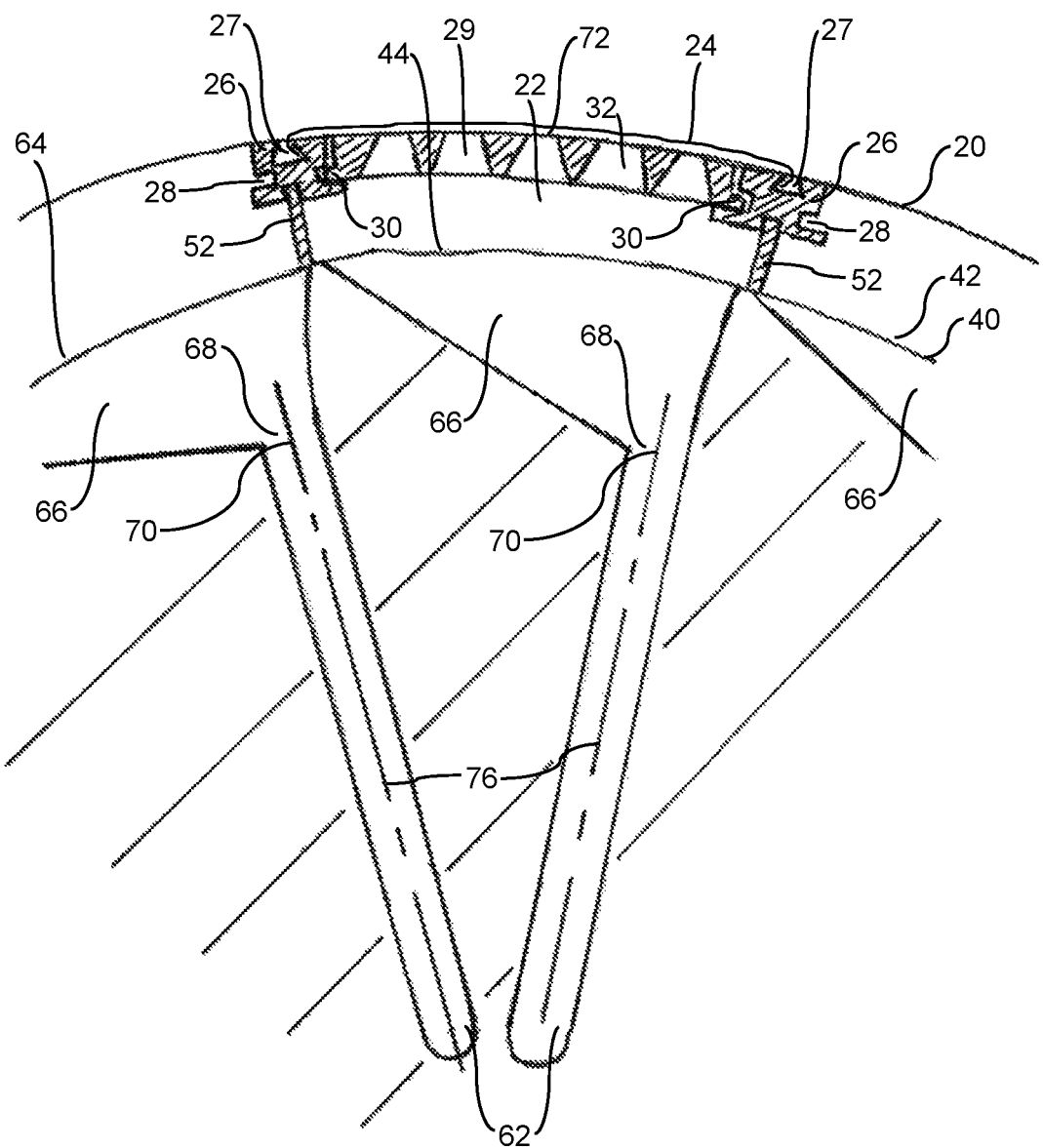
Figure 7:
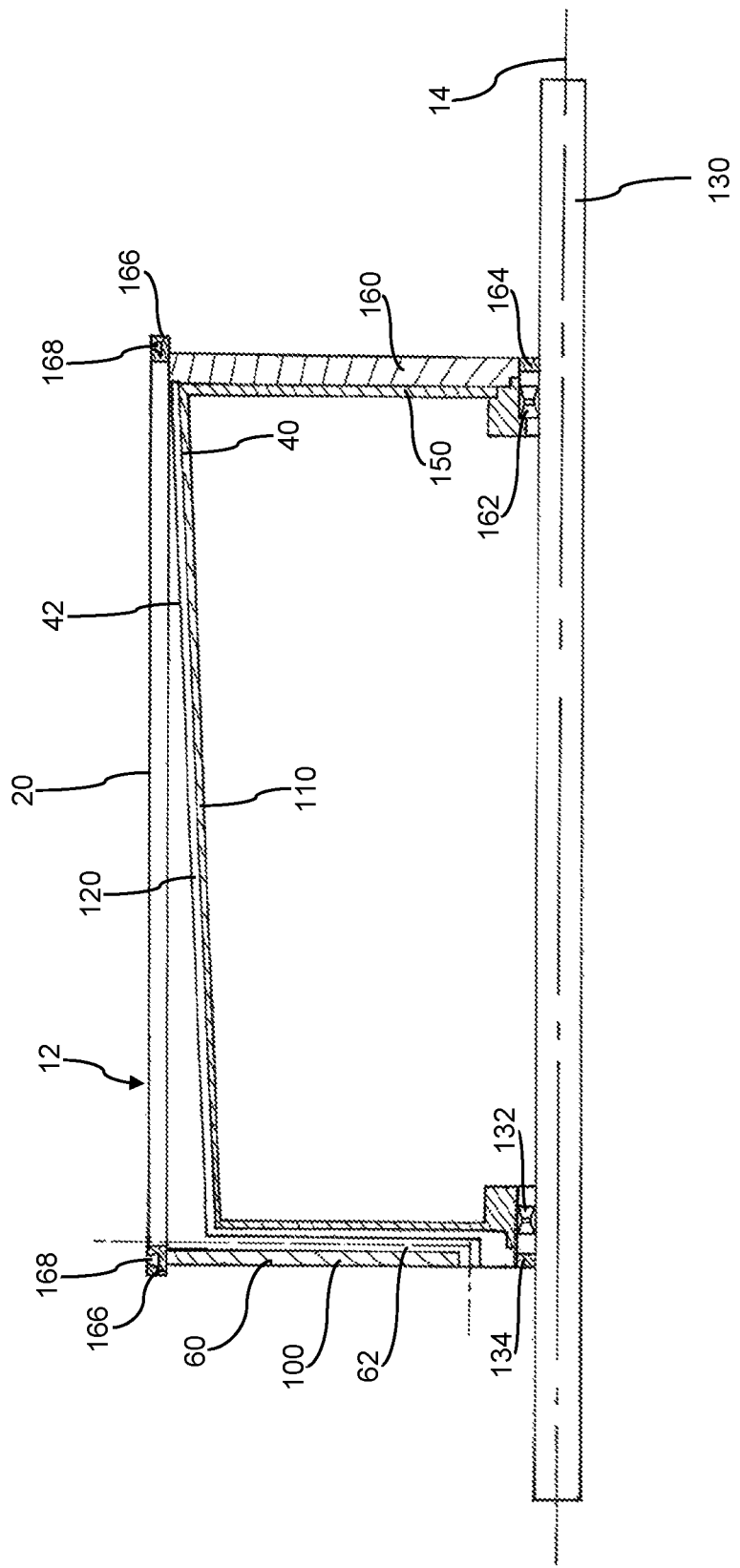
Figure 8:
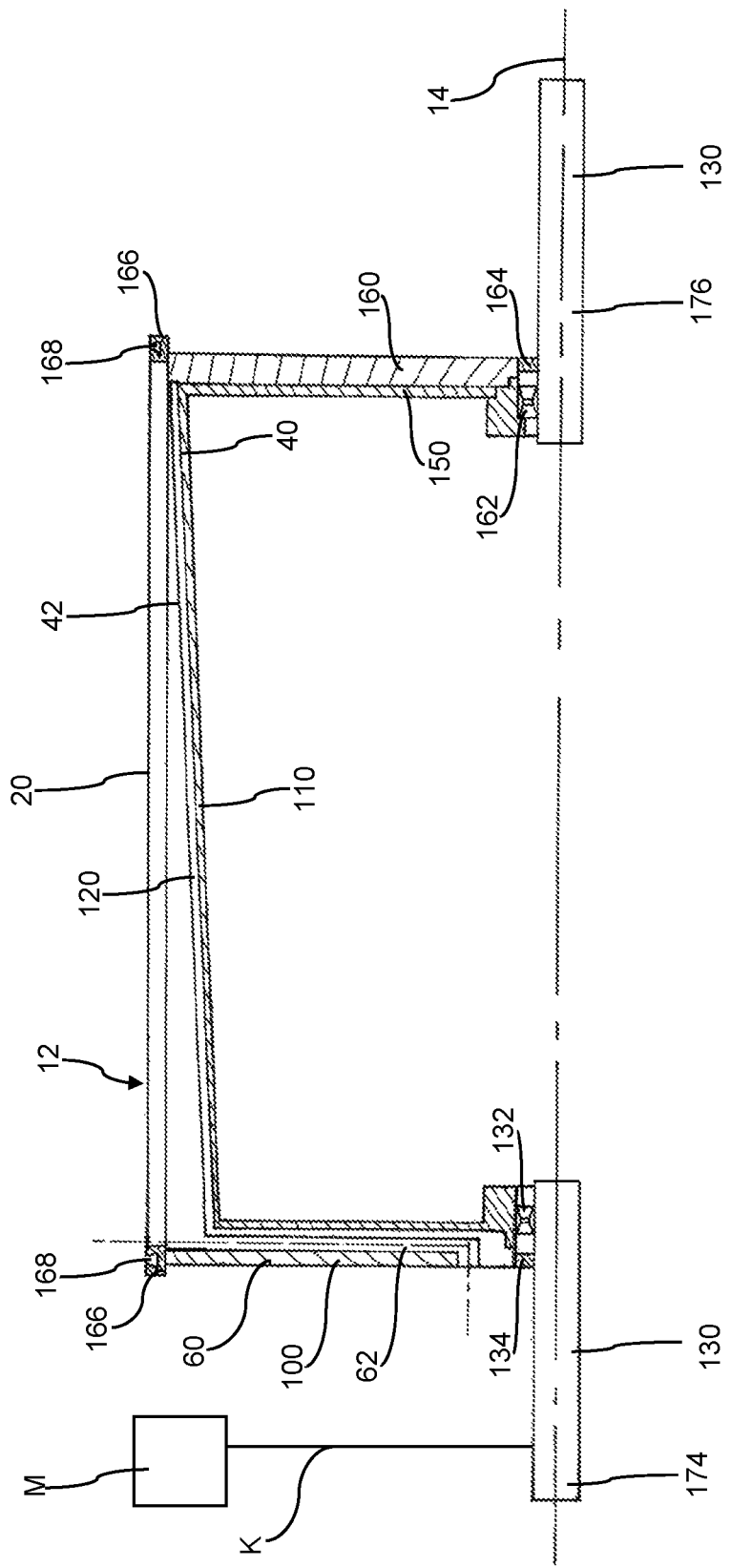

Hereafter, the invention is explained by means of embodiments with reference to the figures. In the figures:

FIG. 1 shows a schematic view of a vacuum and/or pressure filtration device with a sectioned perspectively shown filter drum, FIG. 2 shows a partially sectioned front view of the filter drum of FIG. 1 in the direction of the arrow A, FIG. 3 shows a longitudinal partial sectional view of the filter drum of FIG. 1, FIG. 4 shows a detailed view of the detail D of the filter drum of FIG. 1, FIG. 5 shows a detailed view of the detail B of the filter drum of FIG. 3, FIG. 6 shows a schematic detailed view of a cutout of FIG. 2, FIG. 7 shows a schematic longitudinal partial sectional view of the filter drum of FIG. 1, and FIG. 8 shows a further embodiment of a vacuum and/or pressure filtration device with a schematic longitudinal partial sectional view of its filter drum.

V. DETAILED DESCRIPTION OF THE DRAWINGS

As apparent from the figures, a vacuum and/or filtration device 10 for filtration of a suspension, which comprises a solid and a liquid, includes a filter drum 12, wherein the filter drum 12 defines a drum axis 14, wherein the filter drum 12 is rotatably supported around the drum axis 14 via rotational bearings 16, 18. The filter drum 12 includes an outer jacket 20, which is, e.g., formed cylindrically and by which a plurality of filter cells 22 are formed, which filter cells 22 are formed in an elongated manner and extend along the drum axis 14 and which filter cells 22 are arranged adjacent to each other around the drum axis 14. Between the filter cells 22 there extend separator bars (e.g. fixation bars or clamping bars) 26 which extend longitudinally along the drum axis 14. The separator bars 26 respectively include, on their side facing radially and outwardly, a separator bar groove 27 (see, e.g., FIG. 2) which extends along the drum axis 14 along/by the entire length of the separator bar 26. Between respectively two adjacent separator bars 26 there is respectively arranged a filter medium 24 which is held on the filter drum 12 by these adjacent separator bars 26 by, e.g., being clamped along its rims into the respectively assigned separator bar groove 27 of the two adjacent separator bars 26 by a non-illustrated clamping rod or clamping piping which extends in and along the separator bar groove 27. The respective filter medium 24 may, for example, be a flexible textile (e.g. mesh).

In a further example, the separator bars 26, respectively on their longitudinal sides opposite to each other, include two longitudinal side grooves 28 which extend along the drum axis 14, e.g., extend along the entire length of the separator bars 26. For example, between two adjacent separator bars 26, a plurality of filter cell inserts 29 are respectively arranged, which are received, on their side rims 30, in the longitudinal side grooves 29 (see, e.g., FIG. 6) and which, respectively together and per filter cell 22, form a firm radial support for the respective filter medium 24 of the respective filter cell 22, which filter medium 24 is arranged outside on the filter cell inserts 29. The filter cell inserts 29 further include (radial) filtrate passage openings 32, through which the filtrate, which has passed the filter medium 24 resting thereon, can pass and/or passes the filter cell inserts 29 toward an inner jacket 40 of the filter drum 12, which inner jacket 40 will be described hereafter.

The filter drum 12 may, for example, be arranged such that it rotates within a pan W, in which the suspension S to be filtered is located.

The filter drum 12 further includes an inner jacket 40 which is arranged (radially inside and) adjacent to the outer jacket 20 and which has an inner jacket outer surface 42 which limits the filter cells 22 radially inside such that by the inner jacket outer surface 42 a plurality of draining surfaces 44, of which respectively one is assigned to each filter cell 22, are formed, on which (draining surfaces 44) the liquid, which passes through the filter medium 24 during filtration of the suspension, can drain off as a filtrate, and which the inner jacket 40 is formed so as to be conically tapered along the drum axis 14 toward a drum end face 50 of the filter drum 12 such that the respective draining surface 44 correspondingly extends radially and inwardly toward the one drum end face 50 of the filter drum 12 in an inclined manner. The separator bars 26 are fixed to the inner jacket 40 by separating webs 52, which separating webs 52 are elongated and extend along the drum axis 14 and (together with the separator bars 26) separate/divide adjacent filter cells 22 from each other in a circumferential direction of the filter drum 12.

The filter drum 12 further includes a first drum end face-sided plate 60, which here is formed as a ring plate 60 (hereafter the term "first ring plate 60" is continued to be used, wherein the features described in this context also apply to the first drum end face-sided plate 60), in which a plurality of discharge channels 62, respectively assigned to the filter cells 22, for discharging the filtrate are formed, wherein the draining surfaces 44 and the discharge channels 62 are fluidly connected to each other in a respectively assigned manner, wherein the first drum end face-sided ring plate 60 is equipped along its outer circumference 64 with a plurality of recesses 66, which recesses 66 are respectively assigned to the discharge channels 62 and recesses 66 form an inlet 68 of the respectively assigned discharge channel 62, into which the respectively assigned draining surface 44 leads and which is formed in a manner so as to be tapered toward the discharge channel 62 such that the respective discharge channel 62 is connected to the assigned recess 66 at the radially innermost site 70 of this recess 66.

The radially innermost site 70 of each recess 66, seen in the direction of the drum axis 14, is arranged offset with respect to a circumferential center 72 of an outer circumferential portion 74 of the respective filter 22 (e.g. of the respective recess 66) in the direction of rotation DR, applied during filtration operation, of the filter drum 12. In other words, the radially innermost site 70 of each recess 66 is arranged such that it is formed asymmetric with respect to the center line 76 of the corresponding discharge channel 62 in such a manner that, seen from the center line 76 of the corresponding discharge channel 62, a smaller portion of the recess 66 (e.g. <30% of the total size of the recess 66) is formed in the direction of rotation DR and a larger portion of the recess 66 (e.g. ≥70% of the total size of the recess 66) is formed opposite to the direction of rotation DR.

The first drum end face-sided ring plate 60 further includes a first load-bearing inner (axially inner, as seen along the drum axis 14) support plate 90, which here is formed as a ring plate 90 (hereafter the term "first support ring plate 90" is continued to be used, wherein the features described in this context also apply to the first support plate 90), and an outer (axially outer, as seen along the drum axis 14) functional plate 100, which here is formed as a functional ring plate 100 (hereafter the term "functional ring plate 100" is continued to be used, wherein the features described in this context also apply to the outer functional plate 100). The outer functional ring plate 100 is supported (and/or held) by the first support ring plate 90, for example the functional ring plate 100 is planarly connected to the first support ring plate 90. This connection may, for example, be realized by welding or gluing. Further, in the functional ring plate 100, the discharge channels 62 and the recesses 66 are (e.g. integrally) formed in a manner so as to be isolated from the first support ring plate 90. In other words, the discharge channels 62 and the recesses 66 in the functional ring plate 100 are formed such that fluid present therein (e.g. the filtrate present therein) cannot get into contact with the first support ring plate 90.

The functional ring plate 100 may, for example, be formed by a plastic material or by a metallic or ceramic material, which is respectively selected such that it is insensitive and/or (corrosion-)resistant with respect to a touch contact with the suspension and/or the filtrate. Further, the functional ring plate 100 may be coated with such (as previously mentioned) a plastic or such a metallic or ceramic layer.

The inner jacket 40 includes a load-bearing inner support jacket 100 and an outer functional jacket 120. The outer functional jacket 120 is supported and/or carried and/or held by the support jacket 110. For example, the outer functional jacket 120 is planarly connected to the support jacket 110 by gluing or welding. Further, the inner jacket outer surface 42 is formed by the functional jacket 120 in a manner so as to be isolated from the support jacket 110. In other words, the outer functional jacket 120 serves to protect and/or to shield the support jacket 110 from harmful influences of the filtrate and, possibly, of the suspension in the intermediate space (radially) between the outer functional jacket 120 and the outer jacket 20, namely in the filter cell 22. The outer functional jacket 120 may, for example, be formed of a plastic material or a metallic or ceramic material, which is respectively selected such that it is insensitive, e.g. (corrosion-) resistant, against a touch/contact with the suspension and/or the filtrate. Further or alternatively, the outer functional jacket 120 may also be coated with such a (as previously mentioned) plastic material or such a (as previously mentioned) metallic or ceramic material. The support jacket 110 and the first support ring plate 90 are (e.g. to thereby form a load-bearing connection) rigidly connected to each other (e.g. welded to each other).

The vacuum and/or pressure filtration device 10 further includes a drive shaft 130. The drive shaft 130 extends centrally through the filter drum 12. The drive shaft 130 may be connected fixedly or optionally fixedly in a releasable manner to the first inner support ring plate 90 such that a torque applied to the drive shaft 130 can be transmitted from the drive shaft 130 to the filter drum 12 via the first support ring plate 90. The connection of the drive shaft 130 to the first inner support ring plate 90, in the figures, is realized in a releasable manner by a first clamping device (e.g. clamping ring device) 132, wherein the first clamping device 132 is arranged between the first inner support ring plate 90 and the drive shaft 130 such that it exerts a force in a radial direction to the first inner support ring plate 90 and the drive shaft 130 and, thereby, connects them to each other non-positively (e.g. in a force-locked manner) such that a rotational motion of the drive shaft 130 is (non-positively, e.g. in a force-locked manner) transmitted and/or transmittable to the first inner support ring plate 90. The applied torque may, for example, be provided by a drive M, e.g. an electric motor, which is coupled to the filter drum 12 by a mechanical connection K, e.g., by gears, a chain and/or a belt. Between the first drum end face-sided ring plate 60 and the drive shaft 130 there is arranged a sealing device (e.g. ring sealing device) 134 for sealing the filter drum 12 against the drive shaft 130, which (sealing device) may, for example, be formed by a sealing ring or by a (non-load-bearing) welded sealing.

A number/plurality of discharge channel connection openings (e.g. outlet ports) 136 are formed (e.g. integrally formed) in the first drum end face-sided ring plate 60 and/or in its functional ring plate 100 around the drive shaft 130, which are assigned to a respective filtrate discharge channel 62 and which, during filtration operation, are connected to a non-illustrated control head, via which (control head) a vacuum and/or an air pressure is suppliable to the respective discharge channel 62 and, thereby, to the filter cell 22, fluidly connected thereto, in a controlled manner depending on the rotation of the filter drum 12.

The filter drum 12 includes a second drum end face-sided plate 140, which here is formed as a ring plate 140, (hereafter the term "second drum end face-sided ring plate 140" is continued to be used, wherein the features described in this context also apply to the second drum end face-sided plate 140) which, along the drum axis 14, is arranged opposite to the first drum end face-sided ring plate 60. Here, the inner jacket 40 and the outer jacket 20 extend along the drum axis 14 between the two drum end face-sided ring plates 60, 140 and connect the latter to each other. The second drum end face-sided ring plate 140 includes a second load-bearing inner support plate 150, which here is formed as a support ring plate 150, (hereafter the term "second support ring plate 150" is continued to be used, wherein the features described in this context also apply to the second support plate 150), which is rigidly connected (to thereby form a load-bearing connection) to the support jacket 110, for example is connected by welding. Further, the second drum end face-sided ring plate 140 includes a(n) (outer and/or axially outer) cover plate (e.g. cover ring plate) 160 arranged on the second inner support ring plate 150. The cover plate 160, the functional jacket 120 and the functional ring plate 100 are connected to each other such that they form an encapsulation with respect to the two support ring plates 90, 150 and the inner jacket 40, by which (encapsulation) the two support ring plates 90, 150 and the inner jacket 40 are isolated against a touch contact with the suspension S present, during filtration operation, outside on the filter drum 12.

The drive shaft 130 may be connected fixedly or, optionally, fixedly in a releasable manner to the second drum end face-sided ring plate 140 such that a torque applied to the drive shaft 130 can be transmitted from the drive shaft 130 to the filter drum 12 via the two support ring plates 90, 150. The connection of the drive shaft 130 to the second drum end face-sided ring plate 140 in the figures is realized in a releasable manner by a second clamping device (e.g. clamping ring device) 162, wherein the second clamping device 162 is arranged between the second drum end face-sided ring plate 140 and the drive shaft 130 such that it exerts a force in a radial direction onto the second drum end face-sided ring plate 140 and the drive shaft 130 and, thereby, connects those to each other (non-positively, e.g. in a force-locked manner) such that a rotational motion of the drive shaft 130 is transmitted onto the second drum end face-sided ring plate 140. Between the second drum end face-sided ring plate 140 and the drive shaft 130 there is also arranged a sealing device (e.g. ring sealing device) 164 for sealing the filter drum 12 against the drive shaft 130, which (sealing device) may, for example, be formed by a sealing ring or by a (non-load-bearing) welded sealing.

The functional ring plate 100 and the functional jacket 120 as well as, e.g., also the cover plate 160 and the functional jacket 120 are, for example, respectively formed of a plastic material or coated with a plastic material, which plastic material and/or which plastic materials is/are weldable to each other, wherein the welded connection between the functional ring plate 100 and the functional jacket 120 as well as, e.g., also between the cover plate 160 and the functional jacket 120 is/are formed in a non-load-bearing manner. The first support ring plate 90 (and/or the second support ring plate 150) and the support jacket 110 are, for example, respectively of a metal material and are welded to each other under formation of a load-bearing welded connection.

The first drum end face-sided ring plate 60 and the second drum end face-sided ring plate 140 are respectively surrounded by a support ring 166 on their outer circumference, in the outer circumferential end face of which a support ring groove 168 is formed. In these circumferential support ring grooves 168, the filter medium 24 of the respective filter cell 22 is received with its end face-sided filter medium rims and (is) clamped therein by a non-shown respective ring rod or a ring piping, which extends in and along the support ring groove 168.

In the following, a vacuum and/or pressure filtration device according to another embodiment is described based on FIG. 8. The embodiment of FIG. 8 substantially includes all features of the embodiment of FIGS. 1 to 7 such that in the following only the differences between these embodiments are described.

According to the embodiment of FIG. 8, the drive shaft 130 of a vacuum and/or pressure filtration device may, e.g., also be a drive shaft 130 formed by first 174 and second 176 drive shaft elements, which drive shaft elements 174, 176 are provided in a manner to be separated from each other in the axial direction of the filter drum 12, wherein the first drive shaft element 174 is fixed to the first drum end face-sided ring plate 60 in a load-bearing manner by the first clamping device 132 and the second drive shaft element 176 is fixed to the second drum end face-sided ring plate 140 in a load-bearing manner by the second clamping device 162. As shown as an example in FIG. 8, a torque provided by the electric motor M is only applied to the first drive shaft element 174 of the drive shaft 130 by the mechanical connection K, and the drive torque is merely transmitted from this first drive shaft element 174 to the filter drum 12, wherein the second drive shaft element 176 only has the function(s) to transmit and/or receive other rotational bearing reactions/forces.

Although the invention was described by embodiments, the invention is not limited to these embodiments. Instead, the person skilled in the art will also consider alternatives and modifications as being covered by the invention provided that these are within the scope defined by the claims. Hence, the invention, e.g., is not limited to the composite design of the filter drum described in the exemplary embodiment, wherein, e.g., the inner jacket and, e.g., also the respective drum end face-sided ring plate may be made as a respective single element of a single material.

Further, e.g., the cover plate (e.g. the cover ring plate) 160 may also be formed as a functional ring plate which may be formed in a manner as it is described in this application and/or by the preceding embodiments for the functional plate (and the function ring plate, respectively) 100 of the first drum end face-sided plate/ring plate 60.

LIST OF REFERENCE SIGNS 10 vacuum and/or pressure filtration device
12 filter drum
14 drum axis
16 rotational bearing
18 rotational bearing
20 outer jacket
22 filter cells
24 filter medium
26 separator bar
27 separator bar groove
28 longitudinal side groove
29 filter cell insert
30 rim of filter insert element
32 filtrate passage openings
W pan
S suspension to be filtered
M drive
K mechanical connection
40 inner jacket
42 inner jacket outer surface
44 draining surface
50 drum end face
52 separating web
60 first drum end face-sided plate/ring plate
62 discharge channel
64 outer circumference
66 recess
68 inlet
70 radially innermost site 72 circumferential center
74 outer circumferential portion
DR direction of rotation
76 center line
90 first inner support plate/ring plate
100 outer functional plate/ring plate
110 inner support jacket
120 outer functional jacket
130 drive shaft
132 first clamping device
134 sealing device
136 discharge channel connection openings
140 second drum end face-sided plate/ring plate
150 second inner support plate/ring plate
160 cover plate
162 second clamping device
164 sealing device
166 support ring
168 support ring groove
174 first drive shaft element 176 second drive shaft element

The invention claimed is:

1. A vacuum and/or pressure filtration device for filtration of a suspension which comprises a solid and a liquid, the device comprising a filter drum, wherein the filter drum defines a drum axis, the filter drum is rotatably supported around the drum axis, the filter drum includes
an outer jacket by which a plurality of filter cells are formed, the plurality of filter cells extend along the drum axis, the plurality of filter cells are arranged adjacent to each other all around the drum axis and the plurality of filter cells are equipped on their outer side with a filter medium;
an inner jacket is arranged adjacent to the outer jacket, the inner jacket has an inner jacket outer surface which limits the filter cells radially inside such that by the inner jacket outer surface a plurality of draining surfaces are formed and on which the liquid passing through the respective filter medium during filtration of the suspension can drain off as a filtrate, and the inner jacket is formed along the drum axis in a manner so as to be conically tapered at least toward a first drum end face of the filter drum such that the respective draining surface correspondingly extends at least toward the first drum end face of the filter drum in a manner so as to be inclined radially and inwardly; and
a first drum end face-sided plate including a plurality of discharge channels that are embedded in and integrally formed within the first drum end face-sided plate, which discharge channels are respectively assigned to the filter cells, for discharging the filtrate, wherein the respective draining surface is fluidly connected to a respectively assigned one of the discharge channels, and
wherein the first drum end face-sided plate is equipped with a plurality of recesses along its outer circumference,
the plurality of recesses are respectively assigned to the discharge channels, the plurality of recesses form an inlet of the respectively assigned discharge channel into which the respectively assigned draining surface leads and formed in a manner so as to be tapered toward the discharge channel such that the respective discharge channel is connected to the assigned recess at the radially innermost site of said assigned recess,
the first drum end face-sided plate includes a first load-bearing inner support plate and an outer functional plate which is directly supported by the first load-bearing inner support plate and in which the discharge channels and the recesses are formed in a manner so as to be isolated from the first load-bearing inner support plate such that the first load-bearing inner support plate is fluidly isolated from the suspension and the filtrate passing through the discharge channels and the recesses during use,
the outer functional plate is a monolithic structure, and
the discharge channels include elongated cavities embedded within the outer functional plate.

2. The vacuum and/or pressure filtration device according to claim 1, wherein, seen in direction of the drum axis, the radially innermost site of each recess is arranged offset with respect to a circumferential center of an outer circumferential portion of the respective filter cell in a direction of rotation of the filter drum.

3. The vacuum and/or pressure filtration device according to claim 1,
wherein the recesses include radially tapering depressions formed in a surface of the outer functional plate along a circumference of the outer functional plate, and
wherein each depression continuously tapers toward the respective discharge channel.

4. The vacuum and/or pressure filtration device according to claim 1, wherein the inner jacket includes a load-bearing inner support jacket and an outer functional jacket which is supported by the support jacket and by which the inner jacket outer surface is formed in a manner so as to be isolated from the load-bearing inner support jacket.

5. The vacuum and/or pressure filtration device according to claim 1, wherein
the recesses include radially tapering depressions formed in the outer functional plate,
the inner jacket includes a load-bearing inner support jacket and an outer functional jacket which is supported by the load-bearing inner support jacket and by which the inner jacket outer surface is formed in a manner so as to be isolated from the load-bearing inner support jacket, and
the load-bearing inner support jacket and the first load-bearing inner support plate are rigidly connected to each other, and wherein the load-bearing inner support jacket, the first load-bearing inner support plate, the outer functional plate and the outer functional jacket are arranged and configured such that the load-bearing inner support jacket and the first load-bearing inner support plate are isolated from both the recesses and the inner jacket outer surface.

6. The vacuum and/or pressure filtration device according to claim 5, further comprising a drive shaft extending centrally to the filter drum, wherein the drive shaft is fixedly connected in a releasable manner to the first load-bearing inner support plate such that a torque applied to the drive shaft is transmitted from the drive shaft to the filter drum via the first load-bearing inner support plate.

7. The vacuum and/or pressure filtration device according to claim 5, further comprising a drive shaft extending centrally to the filter drum, wherein the drive shaft is fixedly connected to the first load-bearing inner support plate such that a torque applied to the drive shaft is transmitted from the drive shaft to the filter drum via the first load-bearing inner support plate.

8. The vacuum and/or pressure filtration device according to claim 7, wherein the filter drum includes
a second drum end face-sided plate which, along the drum axis, is arranged opposite to the first drum end face-sided plate, wherein the inner jacket and the outer jacket, along the drum axis, extend between the two drum end face-sided plates and connect them to each other, and wherein the second drum end face-sided plate includes a second load-bearing inner support plate, which is rigidly connected to the load-bearing inner support jacket, and a cover plate arranged on the second load-bearing inner support plate, wherein the cover plate, the outer functional jacket and the outer functional plate are connected to each other such that they form an encapsulation with respect to the two load-bearing inner support plates and the load-bearing inner support jacket, by which the two load-bearing inner support plates and the load-bearing inner support jacket are isolated against a touch contact with the suspension present outside on the filter drum during filtration operation.

9. The vacuum and/or pressure filtration device according to claim 8, wherein the drive shaft is fixedly connected in a releasable manner to the second drum end face-sided plate such that a torque applied to the drive shaft is transmitted from the drive shaft to the filter drum via the two load-bearing inner support plates.

10. The vacuum and/or pressure filtration device according to claim 8, wherein the drive shaft is fixedly connected to the second drum end face-sided plate such that a torque applied to the drive shaft is transmitted from the drive shaft to the filter drum via the two load-bearing inner support plates.

11. The vacuum and/or pressure filtration device according to claim 1, wherein the inner jacket includes a load-bearing inner support jacket and an outer functional jacket which is supported by the load-bearing inner support jacket and by which the inner jacket outer surface is formed in a manner so as to be isolated from the load-bearing inner support jacket; and the device further comprising a drive shaft extending centrally to the filter drum, wherein the drive shaft is fixedly connected to the first load-bearing inner support plate such that a torque applied to the drive shaft is transmitted from the drive shaft to the filter drum via the first load-bearing inner support plate.

12. The vacuum and/or pressure filtration device according to claim 11, wherein the filter drum includes a second drum end face-sided plate which, along the drum axis, is arranged opposite to the first drum end face-sided plate, wherein the inner jacket and the outer jacket, along the drum axis, extend between the two drum end face-sided plates and connect them to each other, and wherein the second drum end face-sided plate includes a second load-bearing inner support plate, which is rigidly connected to the load-bearing inner support jacket, and a cover plate arranged on the second load-bearing inner support plate, wherein the cover plate, the outer functional jacket and the outer functional plate are connected to each other such that they form an encapsulation with respect to the two load-bearing inner support plates and the load-bearing inner support jacket, by which the two load-bearing inner support plates and the load-bearing inner support jacket are isolated against a touch contact with the suspension present outside on the filter drum during filtration operation.

13. The vacuum and/or pressure filtration device according to claim 12, wherein the drive shaft is fixedly connected in a releasable manner to the second drum end face-sided plate such that a torque applied to the drive shaft is transmitted from the drive shaft to the filter drum via the two load-bearing inner support plates.

14. The vacuum and/or pressure filtration device according to claim 12, wherein the drive shaft is fixedly connected to the second drum end face-sided plate such that a torque applied to the drive shaft is transmitted from the drive shaft to the filter drum via the two load-bearing inner support plates.

15. The vacuum and/or pressure filtration device according to claim 1, wherein the outer functional plate is planarly coupled to the first load-bearing inner support plate, wherein the inner jacket includes a load-bearing inner support jacket and an outer functional jacket which is supported by the load-bearing inner support jacket and by which the inner jacket outer surface is formed in a manner so as to be isolated from the load-bearing inner support jacket, and wherein the outer functional plate and the outer functional jacket are of a different material than the first load-bearing inner support plate and the load-bearing inner support jacket.

16. The vacuum and/or pressure filtration device according to claim 15, wherein the outer functional plate and the outer functional jacket are of a same material, and/or the first load-bearing inner support plate and the load-bearing inner support jacket are of a same material.

17. The vacuum and/or pressure filtration device according to claim 16, wherein the outer functional plate and the outer functional jacket are of a plastic material, and/or the first load-bearing inner support plate and the load-bearing inner support jacket are of a weldable metal material and are welded to each other to thereby form a load-bearing welded connection.

18. The vacuum and/or pressure filtration device according to claim 15, wherein the outer functional plate and the outer functional jacket are of a plastic material, and/or the first load-bearing support plate and the load-bearing inner support jacket are of a weldable metal material and are welded to each other to thereby form a load-bearing welded connection.

19. The vacuum and/or pressure filtration device according to claim 3, wherein the inner jacket includes a load-bearing inner support jacket and an outer functional jacket which is supported by the load-bearing inner support jacket, the outer functional jacket includes the inner jacket outer surface including the plurality of draining surfaces, and the outer functional jacket is configured to overlap the recesses and form a tight seal with the outer functional plate such that in an area of the intersection between the respective draining surface and recess the filtrate is isolated from the first load-bearing inner support plate and the load-bearing inner support jacket.

* * * * *